J. B. DALBEY.
LIGHTING SYSTEM.
APPLICATION FILED MAR. 16, 1915.
1,216,662.
Patented Feb. 20, 1917.
3 SHEETS—SHEET 1.
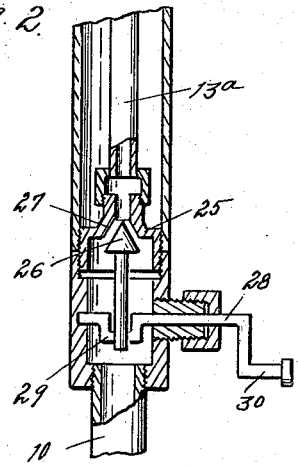
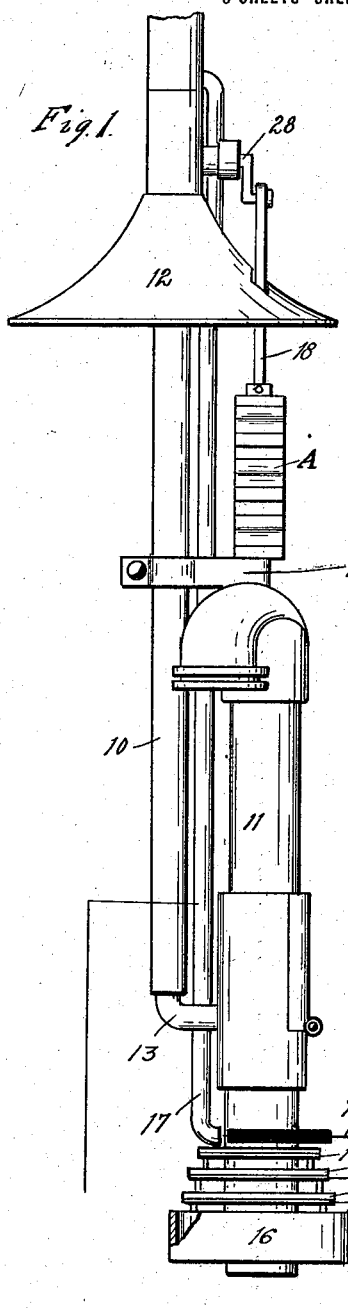
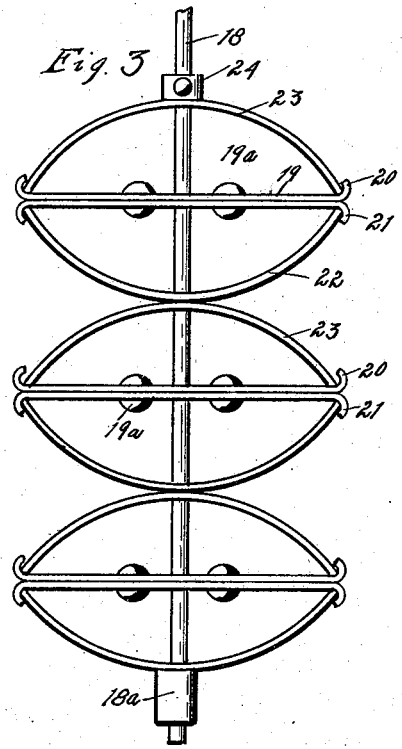

J. B. DALBEY.
LIGHTING SYSTEM.
APPLICATION FILED MAR. 16, 1915.
1,216,662.
Patented Feb. 20, 1917.
3 SHEETS—SHEET 2.
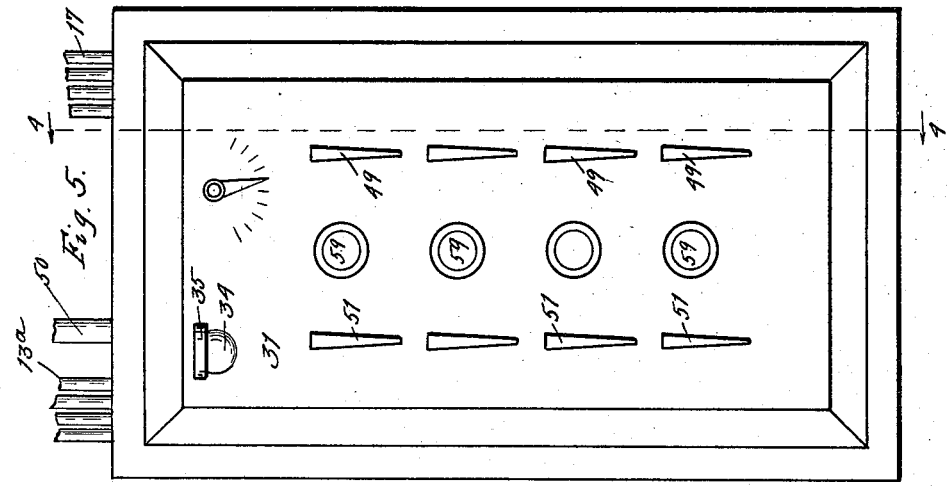
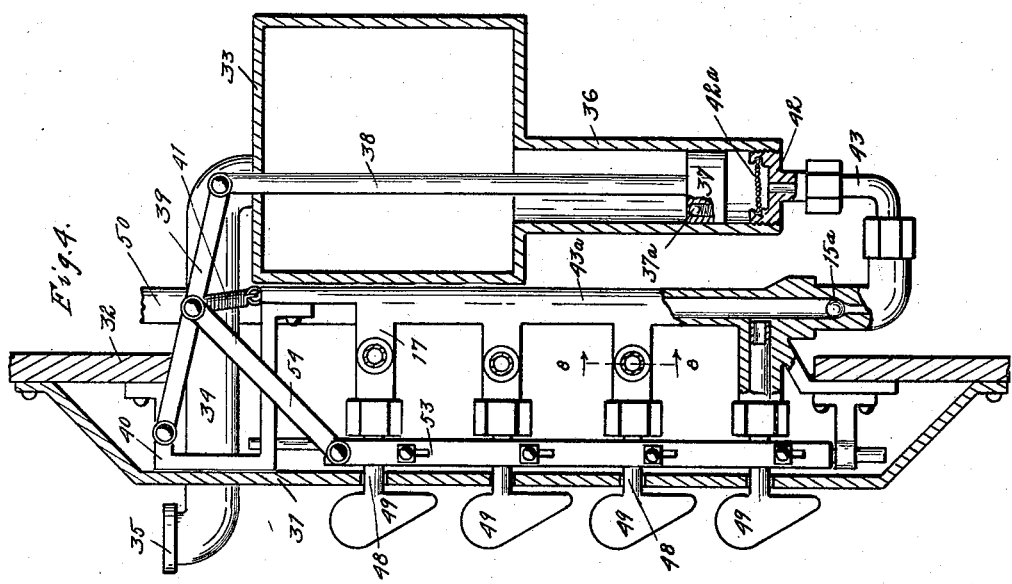
Witnesses
G. F. Turechek
Will Freeman
Inventor
Joel B. Dalbey
By Orwig & Bair
Attys.

J. B. DALBEY.
LIGHTING SYSTEM.
APPLICATION FILED MAR. 16, 1915.
1,216,662.
Patented Feb. 20, 1917.
3 SHEETS—SHEET 3.
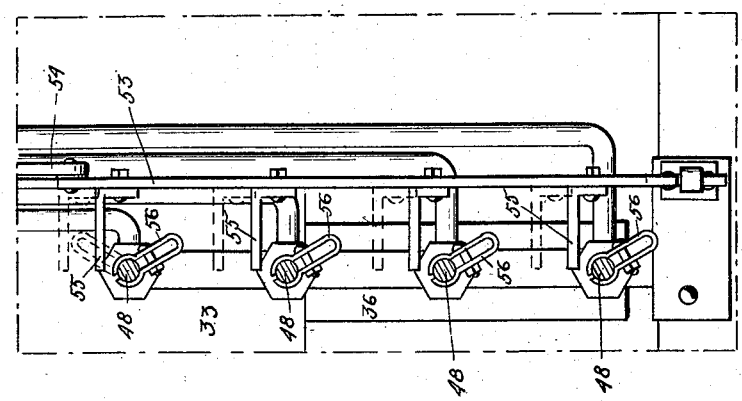
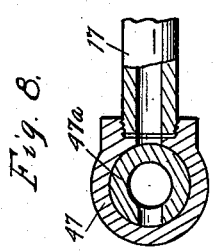
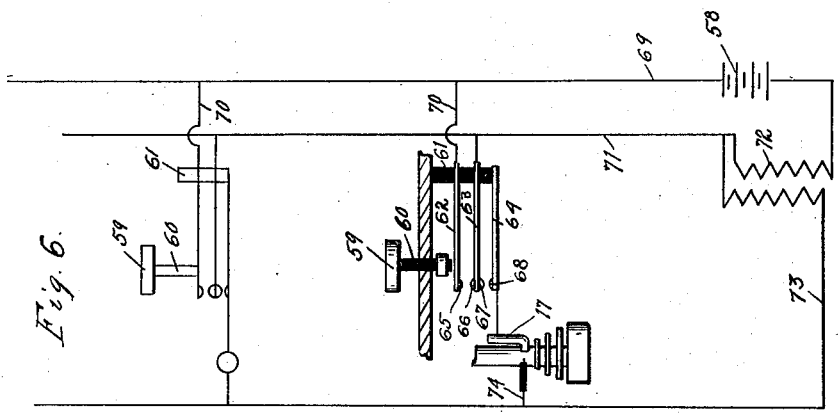
Witnesses.
G. F. Furechek.
Will Freeman
Inventor
Joel B. Dalbey.
By Orwig & Bair
Att'ys

UNITED STATES PATENT OFFICE.

JOEL BENJ. DALBEY, OF NEVADA, IOWA, ASSIGNOR OF ONE-HALF TO JAY A. KING, OF NEVADA, IOWA.

LIGHTING SYSTEM.

1,216,662.　　　　Specification of Letters Patent.　　Patented Feb. 20, 1917.

Application filed March 16, 1915. Serial No. 14,830.

*To all whom it may concern:*

Be it known that I, JOEL BENJ. DALBEY, a citizen of the United States, and resident of Nevada, in the county of Story, in the State of Iowa, have invented a certain new and useful Lighting System, of which the following is a specification.

My invention relates to that class of lighting systems in which a gas generated from a suitable fuel is burned.

The object of my invention is to provide such a lighting system of simple, durable and inexpensive construction.

A further object is to provide such a system including a wall fixture or installation, having parts so constructed and arranged as to make it possible to control a light or a plurality of lights from one or more of such fixtures.

A further object is to provide simple means for controlling the main fuel supply, the generator fuel supply and a lighting means for the generator fuel.

A further object is to provide a new and novel generator of simple and inexpensive construction.

Still a further object is to provide a thermopile, for automatically controlling the supply of fuel to the burner of a lamp used in such a system.

A further object is to provide a simple lamp peculiarly adapted to be used with the other parts of the mechanism.

My invention consists in the construction, arrangement and combination of the various parts of the device, whereby the objects contemplated are attained as hereinafter more fully set forth, pointed out in my claims and illustrated in the accompanying drawings, in which:

Figure 1 shows a side elevation of a light fixture, embodying a part of my invention.

Fig. 2 shows a detail vertical sectional view of the fuel supply pipe and the controlling valve therein.

Fig. 3 shows an enlarged detail view of the thermopile or automatic device for controlling the fuel valve.

Fig. 4 shows a front elevation of the wall fixture.

Fig. 5 shows a detail sectional view of the same, taken on the line 5—5 of Fig. 4.

Fig. 6 shows a diagrammatic view of the electric wiring system, with details of parts of the mechanism.

Fig. 7 shows a detail sectional view of part of the fuel controlling mechanism, and Fig. 8 shows a detail sectional view of one of the fuel controlling valves taken on the line 8—8 of Fig. 4.

It is well known that where such fuels as gasolene are used for lighting, it is necessary to generate gas with another fuel or with some suitable heating means. My improved lighting system is so constructed and arranged that a plurality of lights may be employed, and located at different points, and the supply of generating fuel may all be controlled from a single fixture or installation, adapted to be mounted at a convenient place, as on the wall. My device is intended to be used with one light or a plurality of lights, as may be desired.

In the drawings, illustrating my invention, filed herewith, I have shown one light comprising the upright member indicated by the reference numeral 10, which serves as a support and also as a fuel conducting and generator tube and having the burner tube 11 on which may be mounted a mantle. Above the burner tube 11 is a heat bell 12. The burner tube 11 is open to the air at its lower end.

Each light fixture may be suspended from the ceiling or wall in any suitable way. A supply tube 13 furnishes fuel to the interior of the burner tube 11 and therethrough to the mantle. The tube 13 may be mounted on the member 10.

The end of the tube 13 within the burner tube 11 may be supplied with the ordinary tip.

Mounted on the burner tube 11 below the point where the tube 13 extends into said burner tube, is a generator device which may be made in various forms, but as shown comprises a plurality of spaced supporting members such as plates 14. On the supporting member is carried suitable non-inflammable material 15 such as for instance asbestos. The supporting members 14 may be graded in size from top to bottom if desired. Below the lower member 14 is a receptacle 16 to take care of any possible drippings. In the drawings the reference character 17 indicates a small tube which discharges upon the upper material 15, and is adapted to supply the generating fluid.

Adjacent to the generator 10 is a thermopile indicated generally in Fig. 1 by the reference character A. The thermopile is built up as follows:

A vertical rod 18 is slidably mounted in a bracket 18ª. Fixed on the rod 18 are a plurality of pairs of metal plates 19, which may be of iron or other suitable metal secured together by suitable devices 19. The ends of the upper plate 19 are curved at 20, and the ends of each lower plate 19 of each pair are curved at 21. Between the curved ends 21 of each lower plate 19, is mounted a metal plate 22, which may be of brass or other metal having a different expansion from that of the plates 19. The plates 22 are provided with suitable openings to receive the rod 18. Similar plates 23 are mounted between the upturned ends 20 of each upper plate 18. Above the uppermost plate 23, a collar 24 is fixed on the rod 18. The lowermost plate 22 rests on the bracket 18ª.

Preferably formed in the member 10 is a valve casing 25, in which is a needle valve 26, adapted to connect with the seat 27 in the tube 13ª.

Suitably mounted in the wall of the member 10 is a shaft 28, formed on which is a crank 29, to which the stem of the valve 26 is pivoted. On the outer end of the shaft 28 is a crank 30, pivoted to the upper end of the rod 18. The parts just described are so arranged that when the thermopile is heated the greater expansion of the members 22 and 23 over the expansion of the member 19 will cause the rod 16 to be moved for unseating the valve 26; whereas when the thermopile is cooled, the rod 16 will be operated to close the valve 26. This is an important feature in a lamp of this type for the reason that in many gasolene lamps, in spite of the effort to build a lamp that will thoroughly vaporize the fuel, the gasolene is furnished to the burner tube and to the mantle partly as a gas and partly as liquid, since there is no means for properly controlling the fuel supply and supplying gasolene only after the generator or burner tube has been thoroughly heated. With my device the thermopile is so arranged that no fuel is supplied to the generator tube until it has been thoroughly and properly heated. Fuel thus supplied will not clog the parts, will not hiss and roar, and will give the maximum light.

It will be understood that the tube 10, the generating device, the burner tube 11, and the thermopile may be relatively located to produce the desired result. As shown the gasolene in the tube 10 will be properly heated and the thermopile will be heated by the heat from the mantle on the tube 11.

Each light fixture, such as has been described, is adapted to be controlled from a wall fixture or installation, which will now be described.

My improved wall fixture comprises a plate 31, adapted to be secured to a wall 32 in any suitable way.

Suitably mounted in the rear of the plate 31 is a generating fuel tank 33, having a filler tube 34 extending from its upper part outwardly through the plate 30, and ordinarily closed by a removable cap 35. The tank 33 may be filled at any time by removing the cap 35 and pouring alcohol or other fuel into the tube 34. Communicating with and extending downwardly from the tank 33 is a cylinder 36 in which is slidably mounted a piston 37 having an upwardly extending stem 38, pivoted to one end of a link 39. The other end of the link 39 is pivotally connected with a supporting member 40 on the plate 31. A spring 41 secured to the lever and to a fixed support, yieldingly holds the piston 37 at the lower position of its movement. Extended through the piston 37 is an opening controlled by a spring controlled check valve 37ª.

In the lower end of the cylinder 36 is a screw plug 42, the lower end of which communicates with the pipe 43. In the plug 42 is a filter 42ª. Communicating with the pipe 43, is an upwardly extending tube or pipe 43ª having a plurality of branches 17 which lead to the various lamps. In each pipe 17 is formed a valve casing 47. The flow of fuel through the pipes 17 to the respective lamps is controlled by valves 47ª in the casings 47 having the stems 48 which extend through the plate 32, and have on their outer ends the heads 49. Mounted back of the plate 31 is a vertically slidable bar 53 to which is pivoted one end of a link 54. The other end of the link 54 is pivoted to the member 39. On the bar 53 is a laterally projecting arm 55 adjacent to each stem 48. Detachably mounted on each stem 48 is a member 56 adapted to engage one of the arms 55. The parts just described are so arranged that when it is desired to furnish lighting fluid to any lamp the head is turned to cause the member 56 to engage an arm 55 for raising the bar 53, the member 39, the stem 38 and the piston 37. Fuel will pass through the piston 37 around the valve 37ª into the lower part of the cylinder 36. When the operator continues to turn the head 49, till the member 56 clears the arm 55, the spring 41 will force the arm 39 and the piston 37 downwardly, thereby forcing a predetermined supply of fuel to the proper tube 17. At the same time the valve 47ª will be in position to permit the flow of fuel from the tube 43ª to the proper tubes 17.

In this connection it should be noted that the device 56 comprises a yoke having a bolt through its arms. By loosening the nut on the bolt the device 56 may be rotated on the stem 48 for varying the lift given to the arm 55 and thereby regulating the amount of generating fuel supplied to a lamp. Adjustability for the same purpose is also accomplished by making the members 55 vertically adjustable on the member 53 as shown.

The heads 49 are located toward one side of the plate 31 in vertical succession. Back of the other side of the plate 31 is a main fuel supply tube 50 having branches 13$^a$ in which are a number of valves of suitable construction having stems extending through the plate 31 and provided with heads 51 arranged in vertical succession. By means of the heads 51 the flow of fuel from the tube 50 to the tubes 13$^a$ may be controlled.

In lighting a lamp, of the type herein referred to, at least three operations are necessary where a generating fluid is employed. The generating fluid must be supplied, it must be lighted, and the main fuel fluid must be supplied. The means for supplying the generator fluid and the main fuel fluid have been described.

A suitable check valve 15$^a$ is provided in the tube 43$^a$.

The arrangement of the generator members 15 furnishes a generator which gives a very hot flame around the fuel tube, and also has considerable advantages over any generator in which the generating fuel is burned in a cup.

It will be noted that the alcohol is burned on the pads themselves. Ordinarily there will be no drippings.

Where the alcohol fluid is burned in a cup, the supply of oxygen is not satisfactory, and the generator does not work as well as when there is a free supply of air to the flame, which may be secured with a device similar to that shown in Fig. 1.

Suitably located, is a source of electric power such, as a series of batteries 58. Mounted on the plate 31 is a plurality of switches. Each switch has a push button 59 on a stem 60 slidably mounted in the plate. Back of the plate 31 a plurality of blocks of insulation 61 are mounted. In each block 61 are mounted the ends of three spaced springs 62, 63 and 64. The outer spring 62 is arranged in the path of a stem 60. On the end of the spring 62 is a contact point 65 adapted to engage a contact point 66 on one side of the middle spring 63, when the spring 62 is forced toward the spring 63. On the opposite side of the spring 63 is a contact point 67, designed to engage a contact point 68 on the spring 64, when the spring 63 is forced toward the spring 64. A wire 69, leading from the source of power 58 has branches 70, leading to the respective springs 62. A wire 71 leads from the other pole of the source of power to the respective springs 62. An induction coil 72 is connected with the wire 71. A wire 73 is connected with the induction coil 72 and has branches 74 leading to the various lamps and terminating near the discharge ends of the tubes 17. Wires 75 connect the various tubes 17 with the respective springs 64. It will be seen that the wire 71 is included in both primary and secondary circuits. It will be understood that the wiring may be arranged in any suitable way to accomplish the purposes, and the fuel tubes may be used as part of the circuit or circuits. The induction coil 72 may be placed in the space back of the plate 31.

The diagram, shown in Fig. 6, illustrates one method of wiring a series of lamps.

In the practical operation of my improved light system, it should be mentioned that the main supply tube 50 is preferably connected with a pressure tank or an elevated tank. The wall fixture may be used with one or a plurality of lights.

Assuming that it is desired to light lamp number 1, the proper head 49 is rotated to raise the piston 37 and for opening one of the valves 47$^a$ for permitting fuel to flow through the tube 17 to the lamp. The proper switch is then operated by pushing the button 59, till both circuits are closed and a spark jumps the gap between the tube 17 and the wire 74 for igniting the generating fuel. The proper head 51 is manipulated to operate the valve for permitting fuel to pass through a tube 13 to the proper lamp. No fuel will pass to the lamp however till the thermopile operates the valve 26. The fuel supply is thus automatically controlled to the extent that fuel will be supplied only after the parts are heated sufficiently to produce gas. The other lamps in succession may be lighted in the same way. Any lamp in the series may be cut out by operating one of the valves 47$^a$ of the supply pipe 82.

In case, for any reason, the supply of fuel to any lamp should be temporarily stopped, the cooling of the thermopile would close the valve 26, so that if the fuel should again be supplied, fuel will not be wasted, and the lamp will not operate until the generating fluid is supplied and the sparking device is again operated.

It is well known that the chief objection to the use of gasolene for lighting purposes arises from the difficulty and inconvenience due to the necessity for using the generating device. The objection to gasolene lighting, which arises from this difficulty is increased when it is desired to use more than one light, for the reason that each light must have its own generating device, and the operation of lighting the lamps is slow, awkward and cumbersome. These difficulties are avoided by my improved lighting system, wherein I employ a wall installation with the parts so arranged and constructed, as to enable the user of the system to control any desired number of lights from one location. No torch or special light is necessary for lighting the generating fluid, and the generating fluid is supplied in a predetermined quantity, which may be varied to meet the different conditions that may arise at different seasons of the year.

My invention may be used with one or more lights or burners.

It will readily be seen that many changes may be made in the construction and arrangement of the parts of my improved lighting system without departing from its essential features and purposes, and it is my intent to cover by this application any such changes which may be included within the scope of my claims.

I claim as my invention—

1. In a device of the class described, the combination of a lamp with a fixture for a lighting system, means on said fixture for controlling the flow of fuel to the lamp, a generator on said lamp, means on the fixtures for controlling the fuel flow to the generator, means on said fixture for causing a spark at said generator, and automatic means on the lamp for controlling the fuel supply thereto according to the heat of the lamp.

2. In a device of the class described, the combination of a series of lamps having generators and burners and a fuel supply tube, with a fixture, means on said fixture for selectively controlling the flow of fuel from said tube to said lamps, means controlled from said fixture for selectively supplying fuel in predetermined quantities to any of said generators, and means controlled from said fixture for selectively lighting the fuel at the generator of any lamp.

3. In a device of the class described, the combination of a series of lamps having generators, and burners, and a fuel supply tube, with a fixture, means on said fixture for selectively controlling the flow of fuel from said tube to said lamps, means controlled from said fixture for selectively supplying fuel in predetermined quantities to any of said generators, and means controlled from said fixture for selectively lighting the fuel at the generator of any lamp, the parts being so arranged that no lighting means can be operated at any lamp, till the generator fuel supplying means for said lamp has been actuated.

4. In a device of the class described, a series of lamps, adapted to burn gasolene or the like, a fixture adapted to be suitably located, a means for measuring fuel in predetermined amounts, means on said fixture for selectively controlling the flow of generating fluid to said lights, means controlled from said fixture for selectively lighting the generating fluid at the different lamps, and additional means on said fixture for controlling the flow of fuel to said lamps from said first means.

5. In a device of the class described, a lamp having a burner, a generating device comprising a plurality of non-inflammable devices arranged in vertical succession adapted to receive and absorb fuel, said device being so located that when said fuel is burned proper parts of the lamp will be heated.

6. In a device of the class described, a series of lamps, a fixture adapted to be suitably located, including a tank for generating fluid, selective means for connecting said tank to the respective lamps, means for supplying a certain predetermined amount of generating fluid from said tank to said last named means, means for supplying fuel to said lamps, a means on said fixtures for selectively controlling the supply of fuel to the respective lamps, means for selectively lighting the generating fluid at each lamp, and means on said fixtures for selectively controlling said last named means at the respective lamps.

7. A fixture for lights comprising a supporting member, a tank thereon, an intake passage extending from said tank through said member, a cap on said intake passage, a measuring device connected with said tank, a discharge tube connected with said measuring device, said measuring device being adapted to permit the flow of a predetermined amount of fuel from said tank to said tube, and being also adapted to force the flow of fuel through the tube.

8. A fixture for lights comprising a supporting member, a tank thereon, an intake passage extending from said tank through said member, a cap on said intake passage, a measuring device connected with said tank, a discharge tube connected with said measuring device, said measuring device being adapted to permit the flow of a predetermined amount of fuel from said tank to said tube, and being also adapted to force the flow of fuel through the tube, a main fuel supply tube connected with said member, a valve therein, and means extending through said member for operating said valve.

9. A fixture for lights comprising a supporting member, a tank thereon, an intake passage extending from said tank through said member, a cap on said intake passage, a measuring device connected with said tank, a discharge tube connected with said measuring device, said measuring device being adapted to permit the flow of a predetermined amount of fuel from said tank to said tube, and being also adapted to force the flow of fuel through the tube, a main fuel supply tube connected with said member, a valve therein, and means extending through said member for operating said valve, an electric circuit and a switch capable of operation from the outside of said member for closing said circuit.

Des Moines, Iowa, February 22, 1915.

JOEL BENJ. DALBEY.

Witnesses:
　A. SHERMAN,
　J. MAHER.

Copies of this patent may be obtained for five cents each, by addressing the "Commissioner of Patents, Washington, D. C."